United States Patent [19]

Ono

[11] Patent Number: 5,418,648
[45] Date of Patent: May 23, 1995

[54] VARIFOCAL LENS SYSTEM

[75] Inventor: Kuniaki Ono, Saitama, Japan

[73] Assignee: Fuji Photo Optical Co., Ltd., Saitama, Japan

[21] Appl. No.: 66,432

[22] Filed: May 25, 1993

[30] Foreign Application Priority Data

May 26, 1992 [JP]  Japan .................................. 4-133481

[51] Int. Cl.$^6$ ............................................. G02B 15/14
[52] U.S. Cl. ..................................... 359/692; 359/691;
  359/689; 359/686; 359/683
[58] Field of Search ............... 359/686, 687, 690, 691,
  359/692, 683, 688, 689

[56] References Cited

U.S. PATENT DOCUMENTS

| | | | |
|---|---|---|---|
| 4,025,167 | 5/1977 | Ikeda | 359/687 |
| 4,452,513 | 6/1984 | Hamanishi | 359/687 |
| 4,468,096 | 8/1984 | Hamanishi | 359/687 |
| 4,468,097 | 8/1984 | Hamanishi | 359/687 |
| 5,155,629 | 10/1992 | Ito et al. | 359/692 |

FOREIGN PATENT DOCUMENTS 61-129613  6/1986  Japan .

*Primary Examiner*—Georgia Y. Epps
*Assistant Examiner*—Michael A. Papalas
*Attorney, Agent, or Firm*—Sixbey, Friedman, Leedom & Ferguson; Gerald J. Ferguson, Jr.; Evan R. Smith

[57] ABSTRACT

A varifocal lens system consists of first and second lens groups arranged in this order from the image forming side. The first lens group consists of four lenses and has a negative refracting power and the second lens group consists of three lenses and has a positive refracting power. The varifocal lens system satisfies the following conditions wherein $R_i$ represents the radius of curvature of the i-th lens surface as consecutively numbered from the image forming side, $d_i$ represents the axial surface separation between the i-th lens surface and the (i+1)-th lens surface as consecutively numbered from the image forming side, $v_i$ represents the Abbe's number of the i-th lens as consecutively numbered from the image forming side, and $_{II}D$ represents the thickness of the second lens group:

$$44 < (v_1 + v_2)/2 \tag{1}$$

$$(v_3 + v_4)/2 < 50 \tag{2}$$

$$0.4 < d_9/{_{II}D} < 0.6 \tag{3}$$

$$1.0 < |R_3/R_4| < 2.0 \tag{4}$$

13 Claims, 7 Drawing Sheets

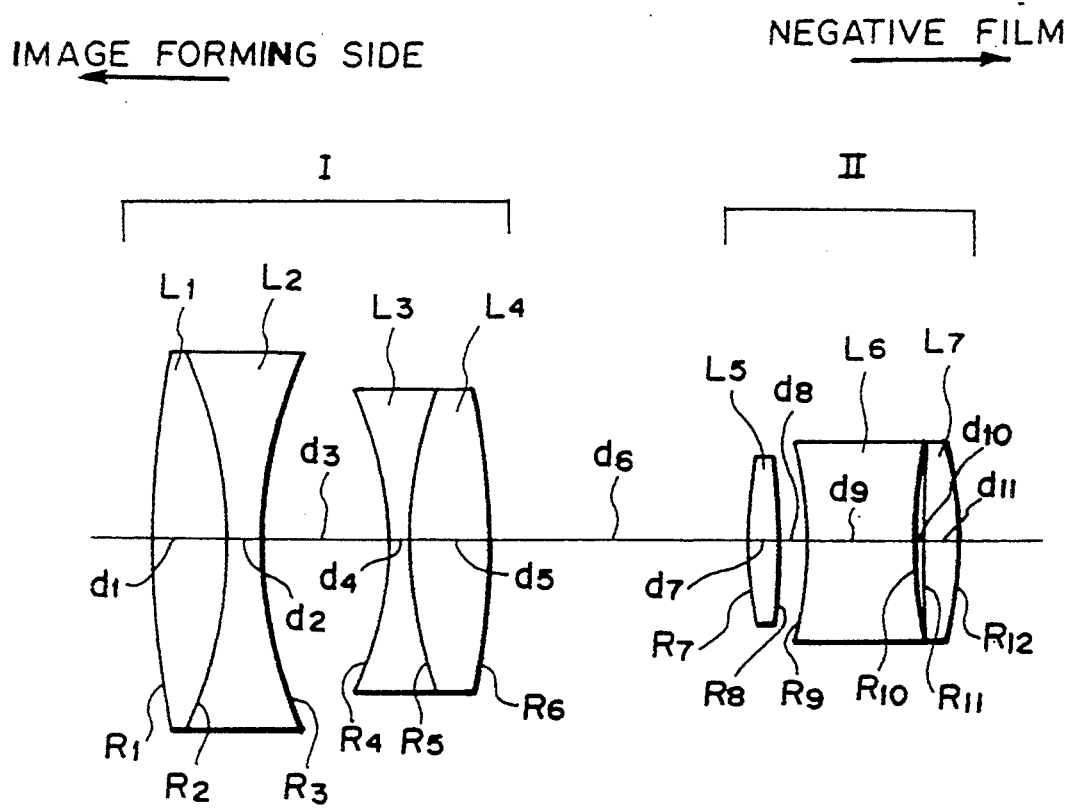

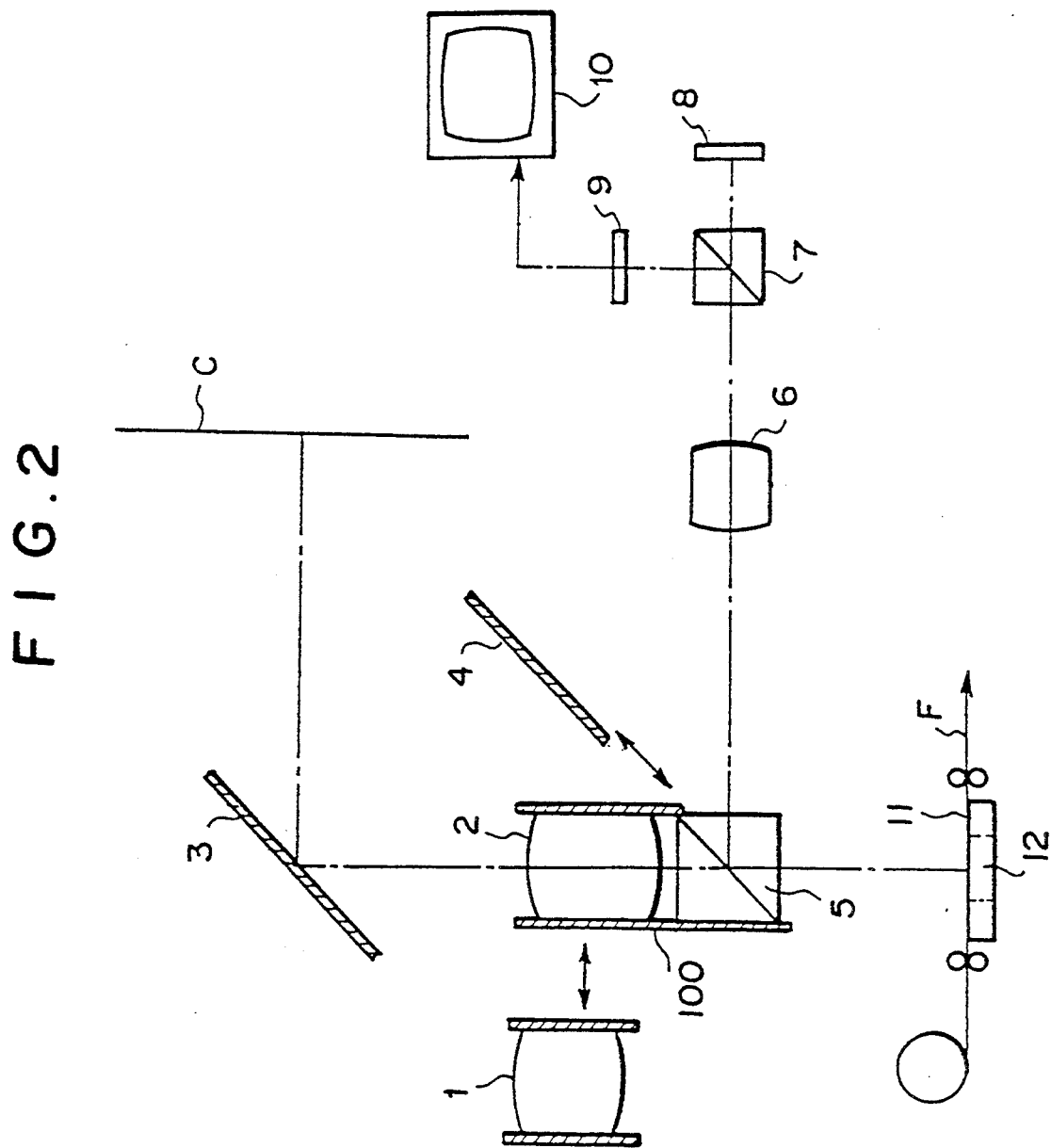

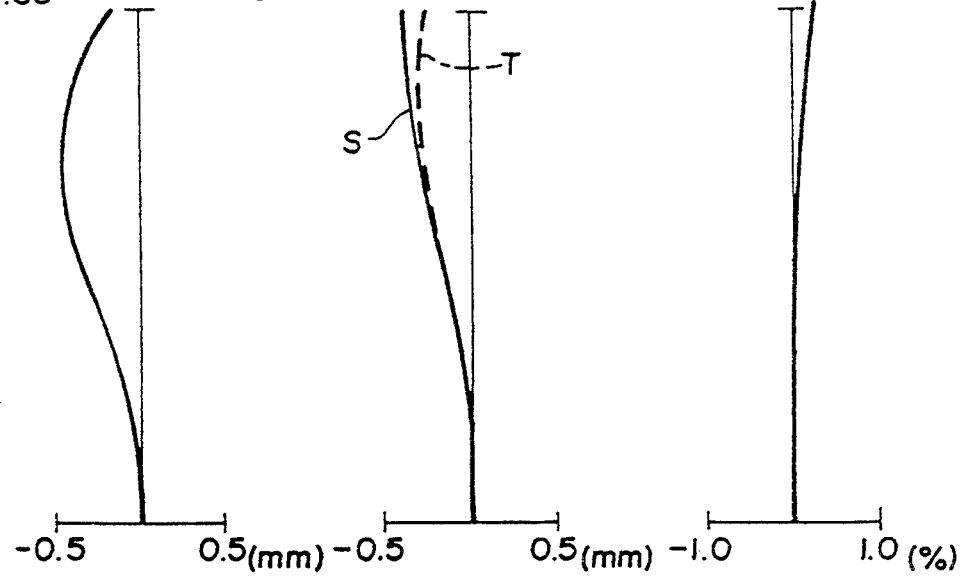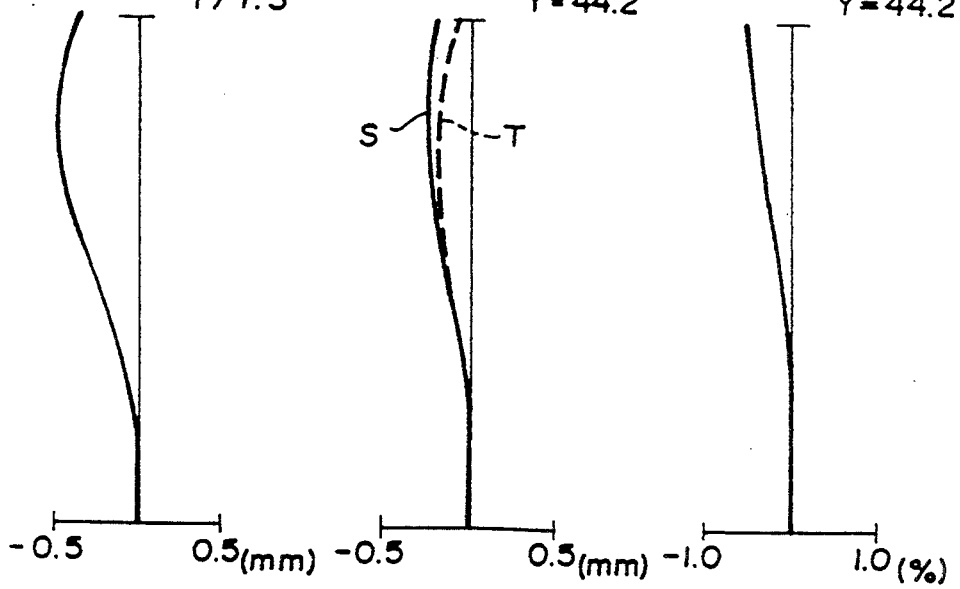

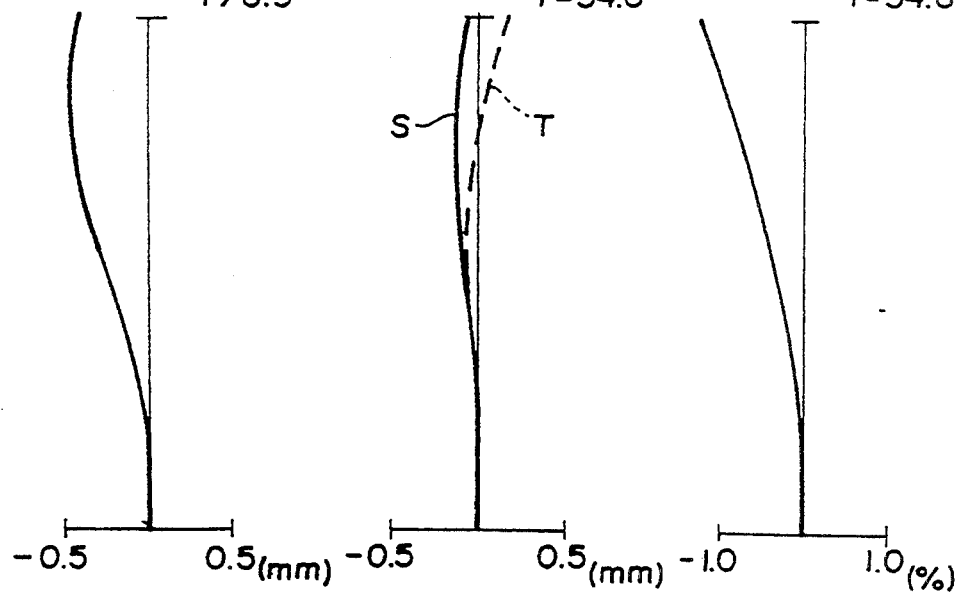
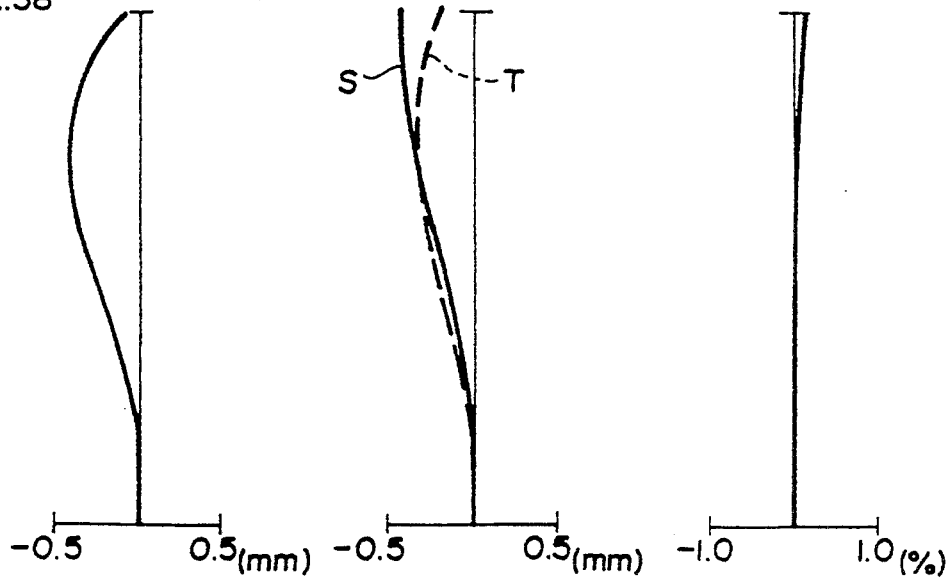

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

VARIFOCAL LENS SYSTEM

BACKGROUND OF THE INVENTION

1. Field of the Invention

This invention relates to a varifocal lens system for high magnifications which is used as a projector lens at a finite distance in an enlarger or the like.

2. Description of the Prior Art

In an enlarger for general use for printing images on photographic paper, a fixed-focus lens is used as the projector lens, and the relative distances between the negative film, the projector lens and the photographic paper are changed. However in an enlarger for commercial use, generally a varifocal lens is used as the projector lens and the positions of the negative film and the photographic paper are fixed.

As such a varifocal lens, there has been known a lens system having a fixed-focus lens which is combined with one or more so-called diopter lens(es) as required. In the lens system, the focal length is changed by changing the combination of the diopter lenses to obtain a desired magnification.

However such a varifocal lens is disadvantageous in that the combination of the diopter lenses is complicated when the change in the focal length is large and the quality of printed image deteriorates, and that it takes a long time to adjust the position of lenses when setting the magnification to a desired value.

There has been proposed a varifocal lens system which consists of a negative lens group and a positive lens group and in which the focal length is changed by changing the distance between the two lens groups. (See Japanese Unexamined Patent Publication No. 61(1986)-129613).

With this varifocal lens system, printed images of high quality can be obtained and at the same time, the diopter lenses can be eliminated, thereby reducing the cost.

However the varifocal lens system consisting of two lens groups is disadvantageous in that the distance between the lens system and the negative film (finite back) becomes too short, e.g., not longer than 90 mm at high magnifications. When the finite back is short, it becomes difficult for the operator to directly see the negative film due to a light measuring mirror inserted between the lens system and the negative film for color correction, which makes difficult the printing operation.

SUMMARY OF THE INVENTION

In view of the foregoing observations and description, the primary object of the present invention is to provide a varifocal lens system which consists of a negative lens group and a positive lens group, in which the finite back can be substantially long as compared with the conventional varifocal lens system consisting of two lens groups, and which is of compact size and is excellent in image forming performance.

The varifocal lens system in accordance with the present invention comprises first and second lens groups arranged in this order from the image forming side, the first lens group consisting of four lenses and having a negative refracting power and the second lens group consisting of three lenses and having a positive refracting power, and satisfies the following conditions wherein $R_i$ represents the radius of curvature of the i-th lens surface as consecutively numbered from the image forming side, $d_i$ represents the axial surface separation between the i-th lens surface and the (i+1)-th lens surface as consecutively numbered from the image forming side, $\nu_i$ represents the Abbe's number of the i-th lens as consecutively numbered from the image forming side, and $II^D$ representis the thickness of the second lens group.

$$44 < (\nu_1 + \nu_2)/2 \tag{1}$$

$$(\sigma_3 + \nu_4)/2 < 50 \tag{2}$$

$$0.4 < d_9/{}_{II}K < 0.6 \tag{3}$$

$$1.0 < |R_3/R_4| < 2.0 \tag{4}$$

The meaning of the above conditions will hereinbelow be described in detail.

Conditions (1) and (2) are for minimizing the change in chromatic aberration with change in the magnification and facilitating correction of aberration in the long focal length side. That is, if $(\nu_1\nu_2)$ is larger than 44 and/or if $(\nu_3\nu_4)/2$ is not smaller than 50, the change in chromatic aberration with change in the magnification becomes too large and correction of aberration in the long focal length side becomes difficult.

Condition (3) is for minimizing distortion. That is, if $d_9/{}_{II}D$ exceeds the upper limit, the finite back becomes short especially at high magnification though distortion becomes small. On the other hand, if falls below the lower limit, distortion becomes too large in the negative direction to correct distortion by the other lenses though the finite back becomes long.

Condition (4) is for maintaining high image forming performance. That is, if $|R_3/R_4|$ exceeds the upper limit, the image plane will greatly incline toward the positive side at high magnification, and if it falls below the lower limit, the image plane will greatly incline toward the negative side at high magnification. In either case, the inclination of the image plane becomes difficult to correct by changing the radii of curvature of the lens surfaces other than R3 and R4.

Thus, in the varifocal lens system in accordance with the present invention which satisfies the above conditions (1) to (4), the finite back can be sufficiently long without deteriorating the image forming performance.

Further the varifocal lens system in accordance with the present invention consists of only two lens groups and is relatively compact in size, and in addition requires no diopter lens. Accordingly, in accordance with the present invention, a compact varifocal lens system can be obtained at low cost without deteriorating the quality of the printed images.

BRIEF DESCRIPTION OF THE DRAWINGS

FIG. 1 is a cross-sectional showing a varifocal lens system in accordance with the present invention, FIG. 2 is a schematic view showing an enlarger employing the lens system, FIGS. 3A to 3C respectively show spherical aberration, astigmatism and distortion of the varifocal lens system in accordance with the first embodiment, wherein the magnification thereof is set to be $-\frac{1}{3}.38$, FIGS. 4A to 4C respectively show spherical aberration, astigmatism and distortion of the varifocal lens system in accordance with the first embodiment, wherein the magnification thereof is set to be $-\frac{1}{3}.26$, FIGS. 5A to 5C respectively show spherical aberration, astigmatism and distortion of the varifocal lens system in accordance with the first embodiment, wherein the magnification thereof is set to be −¼.00, FIGS. 6A to 6C respectively show spherical aberration, astigmatism and distortion of the varifocal lens system in accordance with the second embodiment, wherein the magnification thereof is set to be −½.38, FIGS. 7A to 7C respectively show spherical aberration, astigmatism and distortion of the varifocal lens system in accordance with the second embodiment, wherein the magnification thereof is set to be −⅓.26, FIGS. 8A to 8C respectively show spherical aberration, astigmatism and distortion of the varifocal lens system in accordance with the second embodiment, wherein the magnification thereof is set to be −¼.00, FIGS. 9A to 9C respectively show spherical aberration, astigmatism and distortion of the varifocal lens system in accordance with the third embodiment, wherein the magnification thereof is set to be −½.38, FIGS. 10A to 10C respectively show spherical aberration, astigmatism and distortion of the varifocal lens system in accordance with the third embodiment, wherein the magnification thereof is set to be −⅓.26, and FIGS. 11A to 11C respectively show spherical aberration, astigmatism and distortion of the varifocal lens system in accordance with the third embodiment, wherein the magnification thereof is set to be −¼.00.

DESCRIPTION OF THE PREFERRED EMBODIMENTS

Figure 7A:
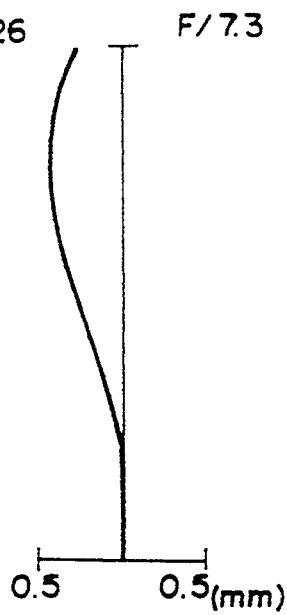

In FIG. 2, an enlarger has a replaceable negative mask 11 having a rectangular opening 12. A negative film F is fed passing across the opening 12. An image on the negative film F is projected on a photographic paper C through a print lens system and a mirror 3. As the print lens, a varifocal lens system 1 in accordance with the present invention and a zoom lens 2 are selectively used. The zoom lens 2 is integrally connected with a split prism 5 to form a zoom lens system 100. When the zoom lens system 100 is used, a part of light transmitted through the negative film F is led to a light measuring system (to be described later) by the split prism 5. When the varifocal lens system 1 is used in place of the zoom lens 2, the zoom lens system 100 is removed and the varifocal length lens system 1 is inserted into the optical path of the light transmitted through the negative film iF and a mirror 4 is inserted into the optical path upstream of the varifocal length lens system 1. In this case, the light transmitted through the negative film F is led to the light measuring system by the mirror 4. When the image on the negative film F is to be projected onto the photographic paper C through the varifocal lens system 1, the mirror 4 is retracted to the position shown by the solid line in FIG. 2. The part of the light deflected toward the light measuring system by the split prism 5 or the mirror 4 is focused on a photodetector 8 through a lens 6. A part of the light transmitted through the lens 6 is deflected by another split prism 7 and focused on a light receiving surface of an image pickup element 9 for a monitor 10. The image signal output from the image pickup element 9 is input into the monitor 10 and is reproduced on the monitor 10 for positioning of the negative film F and the like. There are provided a plurality of negative masks 11 having the openings 12 of different sizes, and one of the negative masks 11 is used according to the size of the negative film F.

Now varifocal lens systems in accordance with first to third embodiments of the present invention will be described, hereinbelow. The varifocal lens systems of the first to third embodiments are the same in the arrangement of the elements and differ from each other in the radii of curvature of the lens surfaces, the axial air separations, the thicknesses of the lenses, the Abbe's numbers of the lenses and the like.

In the description hereinbelow and in FIG. 1, the radii of curvature of the refracting surfaces, the axial surface separations (the axial air separations or thicknesses of lenses), the refractive indices for the sodium d-line, and the Abbe's numbers are respectively designated at R, d, N and $v$ which are numbered respectively by subscripts in order from the image forming side to the negative film side.

That is, each of the varifocal lens systems of the first to third embodiments comprises, as shown in FIG. 1, a first lens group I and a second lens group II arranged in this order from the image forming side. The first lens group I consists of four lenses L1 to L4 arranged in this order from the image forming side and has a negative refracting power. The second lens group II consists of three lenses L5 to L7 and has a positive refracting power. The distance between the first and second lens groups I and II is variable.

The lens L1 is a double-convex lens having the surface of greater curvature faced to the negative film. The lenses L2 and L3 are double-concave lenses each having the surface of greater curvature faced to the image forming side. The lenses L4 and L5 are doubleconvex lenses each having the surface of greater curvature faced to the image forming side. The lens L6 is a double-concave lens having the surface of greater curvature faced to the image forming side. The lens L7 is a double-convex lens having the surface of greater curvature faced to the negative film.

Each of the varifocal lens systems of the first to third embodiments satisfies the following conditions wherein $R_i$ represents the radius of curvature of the i-th lens surface as consecutively numbered from the image forming side, $d_i$ represents the axial surface separation between the i-th lens surface and the (i+1)-th lens surface as consecutively numbered from the image forming side, $v_i$ represents the Abbe's number of the i-th lens as consecutively numbered from the image forming side, and $_{II}D$ represents the thickness of the second lens group.

$$44 < (v_1 + v_2)/2 \tag{1}$$

$$(v_3 + v_4)/2 < 50 \tag{2}$$

$$0.4 < d_9/{}_{II}D < 0.6 \tag{3}$$

$$1.0 < |R_3/R_4| < 2.0 \tag{4}$$

The magnification of the varifocal lens system in accordance with the first embodiment is variable from −½.38 to −¼.00, and the focal length f(mm), the finite back focus Bf(mm), F-number $F_{NO}$ and the image height (negative size) Y(mm) thereof at different magnifications are as shown in table 1.

TABLE 1

| magnification M | −1/2.38 | −1/3.26 | −1/4.00 |
|---|---|---|---|
| focal length f | 141.92 | 121.05 | 106.36 |
| finite back focus Bf | 198.82 | 165.50 | 147.34 |
| F-number $F_{NO}$ | 8.0 | 7.3 | 6.9 |

TABLE 1-continued

| image height Y | 48.8 | 44.2 | 34.6 |

The radii of curvature R(mm) of the respective lens surfaces, the axial surface separations d (mm) (the central thicknesses of the lenses or the air separations), the refractive indexes N for the sodium d-line of the lenses and the Abbe's numbers νd of the lenses of the varifocal lens system of the first embodiment are as shown in table 2. In table 2, the numbers in the leftmost column represents the subscripts given to the symbols R, d and L in FIG. 1.

TABLE 2

| No. | radius of curvature R | axial surface separation d | refracting index N | Abbe's number νd |
| --- | --- | --- | --- | --- |
| 1 | 130.22 | 10.00 | 1.71300 | 53.9 |
| 2 | −58.520 | 4.31 | 1.58144 | 40.8 |
| 3 | 62.443 | 17.50 | | |
| 4 | −42.706 | 2.50 | 1.56873 | 63.1 |
| 5 | 55.226 | 11.50 | 1.60342 | 38.0 |
| 6 | −89.976 | variable | | |
| 7 | 54.148 | 4.80 | 1.71300 | 53.9 |
| 8 | −72.787 | 3.50 | | |
| 9 | −43.474 | 14.48 | 1.59270 | 35.4 |
| 10 | 57.000 | 1.10 | | |
| 11 | 1276.271 | 5.00 | 1.48749 | 70.4 |
| 12 | −41.233 | | | | focal length f1 of the first lens group = −162.94 mm
focal length f2 of the second lens group = 84.48 mm The distance between the first lens group I and the second lens group II is variable and the distances therebetween D at different magnifications M are shown in table 3.

TABLE 3

| magnification M | D |
| --- | --- |
| −1/2.38 | 1.474 |
| −1/3.26 | 18.195 |
| −1/4.00 | 33.904 |

Table 4 shows the focal length f(mm), the finite back focus Bf(mm), F-number $F_{NO}$ and the image height (negative size) Y(mm) at different magnifications of the varifocal lens system in accordance with the second embodiment of the present invention.

TABLE 4

| magnification M | −1/2.38 | −1/3.26 | −1/4.00 |
| --- | --- | --- | --- |
| focal length f | 141.88 | 120.09 | 106.25 |
| finite back focus Bf | 198.03 | 164.88 | 146.82 |
| F-number $F_{NO}$ | 8.0 | 7.3 | 6.9 |
| image height Y | 48.8 | 44.2 | 34.6 |

The radii of curvature R(mm) of the respective lens surfaces, the axial surface separations d (mm) (the central thicknesses of the lenses or the air separations), the refractive indexes N for the sodium d-line of the lenses and the Abbe's numbers νd of the lenses of the second embodiment are as shown in table 5. Also in table 5, the numbers in the leftmost column represents the subscripts given to the symbols R, d and L in FIG. 1.

TABLE 5

| No. | radius of curvature R | axial surface separation d | refracting index N | Abbe's number νd |
| --- | --- | --- | --- | --- |
| 1 | 121.804 | 10.00 | 1.72000 | 50.3 |
| 2 | −58.965 | 4.31 | 1.60342 | 38.0 |
| 3 | 62.024 | 16.32 | | |
| 4 | −43.535 | 2.50 | 1.56872 | 63.1 |

TABLE 5-continued

| No. | radius of curvature R | axial surface separation d | refracting index N | Abbe's number νd |
| --- | --- | --- | --- | --- |
| 5 | 51.472 | 11.60 | 1.60342 | 38.0 |
| 6 | −88.822 | variable | | |
| 7 | 54.205 | 4.80 | 1.71300 | 53.9 |
| 8 | −70.568 | 3.50 | | |
| 9 | −43.035 | 14.48 | 1.59270 | 35.4 |
| 10 | 57.384 | 1.10 | | |
| 11 | 6989.799 | 5.00 | 1.48749 | 70.4 |
| 12 | −41.752 | | | | focal length f1 of the first lens group = −167.82 mm
focal length f2 of the second lens group = 85.48 mm The distance between the first lens group I and the second lens group II is variable and the distances therebetween D at different magnifications M of the second embodiment are shown in table 6.

TABLE 6

| magnification M | D |
| --- | --- |
| −1/2.38 | 1.909 |
| −1/3.26 | 19.373 |
| −1/4.00 | 35.822 |

Table 7 shows the focal length f(mm), the finite back focus Bf(mm), F-number $F_{NO}$ and the image height (negative size) Y(mm) at different magnifications of the varifocal lens system in accordance with the third embodiment of the present invention.

TABLE 7

| magnification M | −1/2.38 | −1/3.26 | −1/4.00 |
| --- | --- | --- | --- |
| focal length f | 141.93 | 121.06 | 106.36 |
| finite back focus Bf | 198.56 | 165.27 | 147.14 |
| F-number $F_{NO}$ | 8.0 | 7.3 | 6.9 |
| image height Y | 48.8 | 44.2 | 34.6 |

The radii of curvature R(mm) of the respective lens surfaces, the axial surface separations d (mm) (the central thicknesses of the lenses or the air separations), the refractive indexes N for the sodium d-line of the lenses and the Abbe's numbers νd of the lenses of the third embodiment are as shown in table 8. Also in table 8, the numbers in the leftmost column represents the subscripts given to the symbols R, d and L in FIG. 1.

TABLE 8

| No. | radius of curvature R | axial surface separation d | refracting index N | Abbe's number νd |
| --- | --- | --- | --- | --- |
| 1 | 125.797 | 10.00 | 1.71300 | 53.9 |
| 2 | −58.894 | 4.12 | 1.58144 | 40.8 |
| 3 | 61.425 | 17.60 | | |
| 4 | −42.804 | 2.50 | 1.56873 | 63.1 |
| 5 | 55.313 | 11.60 | 1.60342 | 38.0 |
| 6 | −90.408 | variable | | |
| 7 | 54.373 | 4.80 | 1.71300 | 53.9 |
| 8 | −72.817 | 3.50 | | |
| 9 | −43.621 | 14.73 | 1.59270 | 35.4 |
| 10 | 57.151 | 1.10 | | |
| 11 | 1135.198 | 5.00 | 1.48749 | 70.4 |
| 12 | −41.454 | | | | focal length f1 of the first lens group = −163.69 mm
focal length f2 of the second lens group = 84.59 mm The distance between the first lens group I and the second lens group II is variable and the distances therebetween D at different magnifications M of the third embodiment are shown in table 9.

TABLE 9

| magnification M | D |
| --- | --- |
| −1/2.38 | 1.399 |
| −1/3.26 | 18.216 |
| −1/4.00 | 34.021 |

Figure 7B:
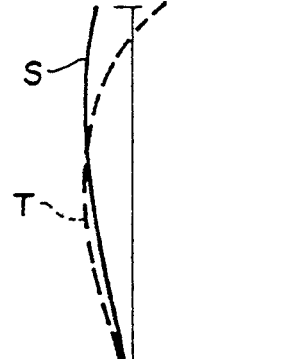
Figure 7C:
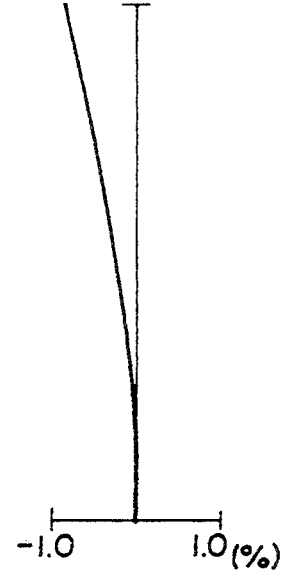
Figure 8A:
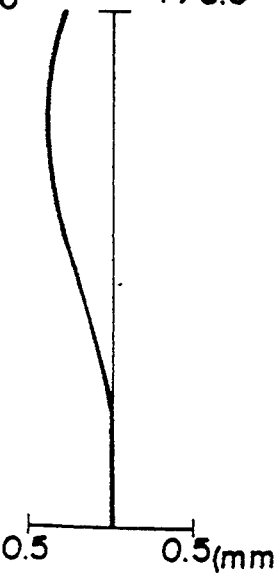
Figure 8B:
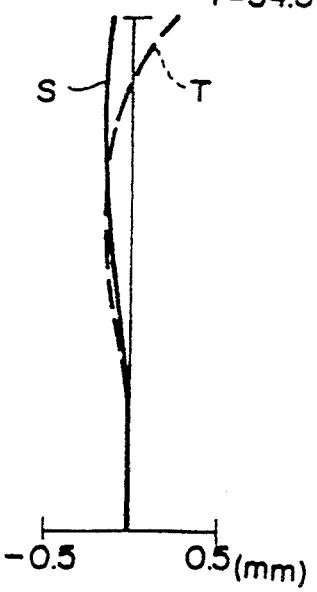
Figure 8C:
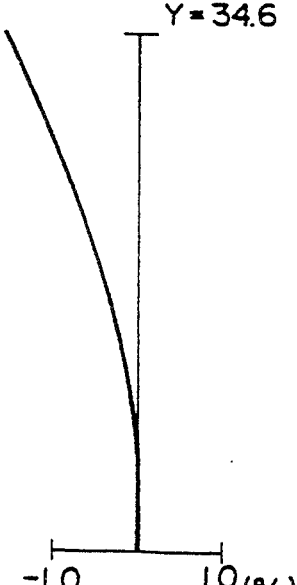
Figure 9A:
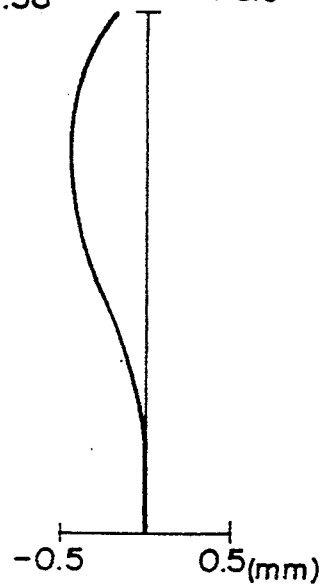
Figure 9B:
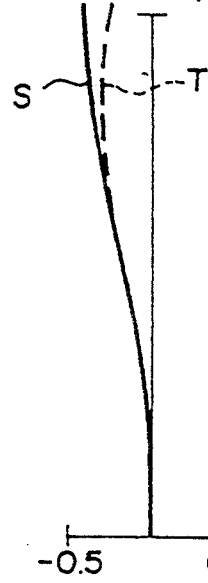
Figure 9C:
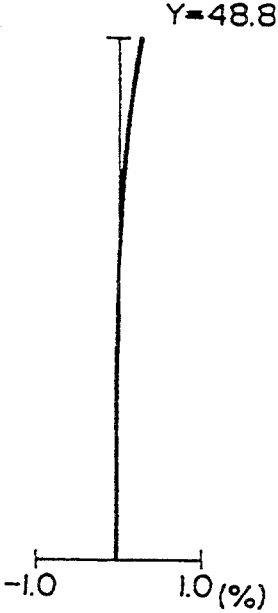
Figure 10A:
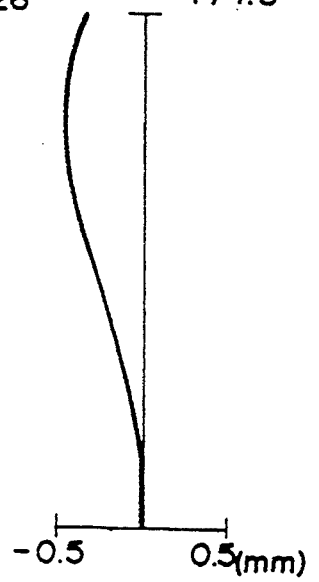
Figure 10B:
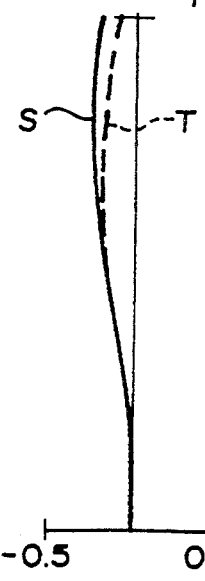
Figure 10C:
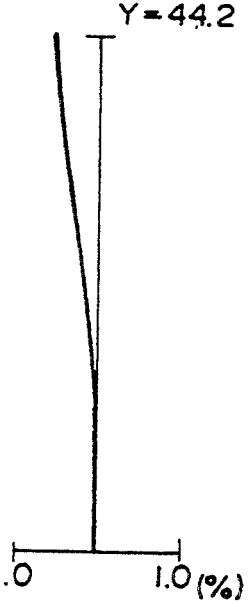
Figure 11A:
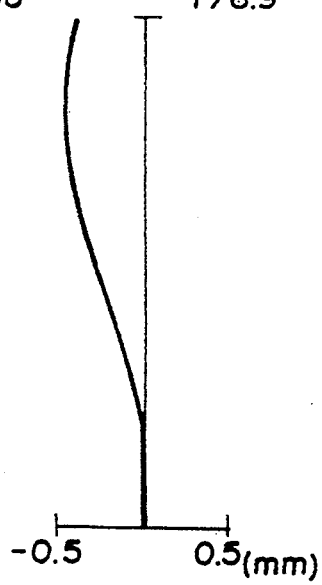
Figure 11B:
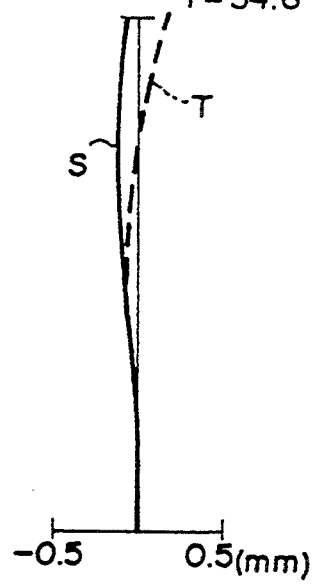
Figure 11C:
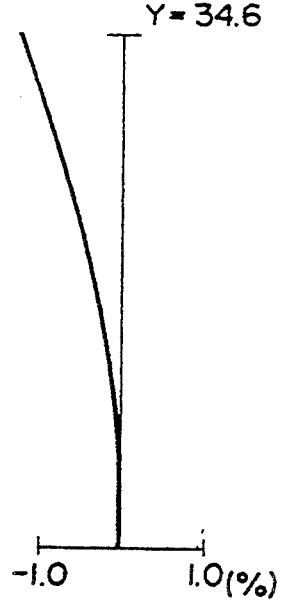

FIGS. 3A to 3C respectively show spherical aberration, astigmatism and distortion of the varifocal lens system in accordance with the first embodiment, wherein the magnification thereof is set to be −1/2.38, FIGS. 4A to 4C respectively show spherical aberration, astigmatism and distortion of the varifocal lens system in accordance with the first embodiment, wherein the magnification thereof is set to be '1/3.26, and FIGS. 5A to 5C respectively show spherical aberration, astigmatism and distortion of the varifocal lens system in accordance with the first embodiment, wherein the magnification thereof is set to be −1/4.00. FIGS. 6A to 6C respectively show spherical aberration, astigmatism and distortion of the varifocal lens system in accordance with the second embodiment, wherein the magnification thereof is set to be −1/2.38, FIGS. 7A to 7C respectively show spherical aberration, astigmatism and distortion of the varifocal lens system in accordance with the second embodiment, wherein the magnification thereof is set to be −1/3.26, and FIGS. 8A to 8C respectively show spherical aberration, astigmatism and distortion of the varifocal lens system in accordance with the second embodiment, wherein the magnification thereof is set to be −1/4.00. FIGS. 9A to 9C respectively show spherical aberration, astigmatism and distortion of the varifocal lens system in accordance with the third embodiment, wherein the magnification thereof is set to be −1/2.38, FIGS. 10A to 10C respectively show spherical aberration, astigmatism and distortion of the varifocal lens system in accordance with the third embodiment, wherein the magnification thereof is set to be −1/3.26, and FIGS. 11A to 11C respectively show spherical aberration, astigmatism and distortion of the varifocal lens system in accordance with the third embodiment, wherein the magnification thereof is set to be −1/4.00.

As can be understood from FIGS. 3 to 11, all of the varifocal lens systems in accordance with the first to third embodiments have excellent optical performances over their entire magnification ranges. Further as can be understood from the tables above, in the varifocal lens systems in accordance with the first to third embodiments, the back focus which is the distance between the lens surface nearest to the negative film and the negative film can be as long as not shorter than 140 mm at high magnifications, which is substantially long as compared with the conventional varifocal lens described above.

The arrangement of the varifocal lens in accordance with the present invention need not be limited to those described above in conjunction with the first to third embodiments, but the number of the lens elements of each lens group, the radius of curvature of each lens element and the like may be variously modified.

Further, though the varifocal lens of the present invention is especially useful for an enlarger, it can be applied to various other optical instruments.

What is claimed is;

1. A varifocal lens system for focusing an image of an object on an image plane, consisting of:
   first and second lens groups arranged with the first lens group closer than the second lens group to the image plane, the first lens group consisting of four lenses and having a negative refracting power and the second lens group consisting of three lenses and having a positive refracting power,
   wherein the varifocal lens system satisfies the following conditions wherein $R_i$ represents the radius of curvature of the i-th lens surface as consecutively numbered from the image plane, $d_i$ represents the axial surface separation between the i-th lens surface and the (i+1)-th lens surface as consecutively numbered from the image plane $v_i$ represents the Abbe's number of the i-th lens as consecutively numbered from the, image plane, and $_{II}D$ represents the thickness of the second lens group:

$$44 < (v_1 + v_2)/2 \tag{1}$$

$$(v_3 + v_4)/2 < 50 \tag{2}$$

$$0.4 < d_9/_{II}D < 0.6 \tag{3}$$

$$1.0 < |R_3/R_4| < 2.0 \tag{4}$$

2. The varifocal lens system of claim 1 wherein the object is an image on a negative film and the image plane is a photographic paper surface, and in which said first lens group consists of four lenses L1, L2, L3, and LA arranged in consecutive order with L1 closest to the image plane, and the second lens group consists of three lenses L5, L6, and L7 arranged in consecutive order with L5 closest to the image plane, the lens L1 being a double-convex lens having a surface of greater curvature facing toward the negative film, the lenses L2 and L3 being double-concave lenses each having a surface of greater curvature facing toward the image plane, the lenses L4 and L5 being double-convex lenses each having a surface of greater curvature facing toward the image plane, the lens L6 being a double-concave lens having a surface of greater curvature facing toward the image plane, the lens L7 being a double-convex lens having a surface of greater curvature facing toward the negative film, and the distance between the first and second lens groups being variable.

3. The lens system of claim 1 further comprising varifocal focusing means for moving at least one of the first and second lens groups as a unit relative to the other of the first and second lens groups to change the overall focal length of the lens system whereby image of various objects in a fixed object plane can be focused on a fixed image plane.

4. A varifocal lens system for focusing an image of an object on an image plane, comprising:
   first and second lens groups arranged with said first group closer to the image plane than said second group, the first lens group having a negative refracting power and consisting of four lenses, and the second lens group consisting of three lenses and having a positive refracting power;
   wherein the varifocal lens system satisfies the following conditions:

$$44 < (v_1 + v_2)/2 \tag{1}$$

$$(v_3 + \Sigma_4)/2 < 50 \tag{2}$$

$$0.4 < d_9/_{II}D < 0.6 \tag{3}$$

$$1.0 < |R_3/R_4| < 2.0 \tag{4}$$

where $R_i$ represents a radius of curvature of the i-th lens surface as consecutively numbered from the image plane, $d_i$ represents the axial surface separation between the i-th lens surface and the (i+1)-th lens surface as consecutively numbered from the image plane, $v_i$ represents the Abbe's number of the i-th lens as consecutively numbered from the image plane, $_{II}D$ represents the thickness of the second lens group, and wherein the lens surfaces having curvatures $R_3$ and $R_4$ respectively are located on different lenses with a space therebetween.

5. The varifocal lens system of claim 4 wherein the first lens group consists of lenses L1, L2, L3, and L4 arranged consecutively with L1 closest to the image plane, L1 being a double-convex lens having a surface of greater curvature facing toward the object.

6. The varifocal lens of claim 5 wherein the second lens group consists of three lenses L5, L6, and L7 arranged in consecutive order with L5 closest to the image plane, and wherein:

lenses L2 and L3 are double-concave lenses each having a surface of greater curvature facing toward the image plane;

lenses L4 and L5 are double-convex lenses each having a surface of greater curvature facing toward the image plane;

lens L6 is a double-concave lens having a surface of greater curvature facing toward the image plane; and lens L7 is a double-convex lens having a surface of greater curvature facing toward the negative film.

7. The varifocal lens system of claim 4 further comprising varifocal focusing means for moving at least one of the first and second lens groups as a unit relative to the other of the first and second lens groups to change the overall focal length of the lens system.

8. The vailfocal l.ens system of claim 7 wherein the varifocal focusing means comprises means for focusing an image on a negative film onto a photosensitive image plane in a photographic enlarger.

9. A varifocal lens system for focusing an image of an object on an image plane, comprising:

first and second lens groups arranged with the first lens group closer than the second lens group to the image plane, the first lens group having a negative refracting power and consisting of four lenses L1, L2, L3, and L4 arranged in consecutive order with L1 closest to the image plane, and the second lens group having a positive refracting power and consisting of three lenses L5, L6, and L7 arranged in consecutive order with L5 closest to the image plane, wherein lens L1 is a double-convex lens, lens L1 has a surface of greater curvature facing toward the image plane, lenses L2 and L3 are double-concave lenses each having a surface of greater curvature facing toward the image plane, lenses L4 and L5 are double zconvex lenses each having a surface of greater curvature facing toward the image plane, lens L6 is a double-concvave lens having a surface of greater curvature facing toward the image plane, lens L7 is a double-convex lens having a surface of greater curvature facing toward the negative film, and the distance between the first and second lens groups is variable.

10. The varifocal lens system of claim 9 further comprising varifocal focusing means for moving at least one of the first and second lens groups as a unit relative to the other of the first and second lens groups to change the overall focal length of the lens system.

11. The vailfocal lens system of claim 10 wherein the varifocal focusing means comprises means for focusing an image on a negative film onto a photosensitive image plane in a photographic enlarger.

12. The varifocal lens system of claim 9 wherein the lens system consists essentially of said first and second lens groups.

13. A varifocal lens system for focusing an image of an object on an image plane, comprising:

first and second lens groups arranged with the first lens group closer than the second lens group to the image plane, the first lens group having a negative refracting power and consisting of four lenses L1, L2, L3, and L4 arranged in consecutive order with L1 closest to the image plane, and the second lens group having a positive refracting power and consisting of three lenses LS, L6, and L7 arranged in consecutive order with L5 closest to the image plane.

wherein lens L1 is a double-convex lens and the vailfocal lens system satisfies the following conditions, wherein $R_i$ represents the radius of curvature of the i-th lens surface as consecutively numbered from the image plane, $d_i$ represents the axial surface separation between the i-th lens surface and the (i+1)-th lens surface as consecutively numbered from the image plane, $v_i$ represents the Abbe's number of the i-th lens as consecutively numbered from the image plane, and lid represents the thickness of the second lens group:

$$44 < (v_1 + v_2)/2 \tag{1}$$

$$(v_3 + v_4)/2 < 50 \tag{2}$$

$$0.4 < d_9/_{II}D < 0.6 \tag{3}$$

$$1.0 < |R_3/R_4| < 2.0 \tag{4}$$

* * * * *